(12) United States Patent
Yoneda

(10) Patent No.: US 11,495,040 B2
(45) Date of Patent: Nov. 8, 2022

(54) INFORMATION PROCESSING APPARATUS FOR DESIGNATION OF IMAGE TYPE, IMAGE READING APPARATUS, AND NON-TRANSITORY COMPUTER READABLE MEDIUM STORING PROGRAM

(71) Applicant: FUJIFILM Business Innovation Corp., Tokyo (JP)

(72) Inventor: Yuji Yoneda, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 144 days.

(21) Appl. No.: 16/926,768

(22) Filed: Jul. 12, 2020

(65) Prior Publication Data

US 2021/0303841 A1 Sep. 30, 2021

(30) Foreign Application Priority Data

Mar. 27, 2020 (JP) .............................. JP2020-058866

(51) Int. Cl.
*G06V 30/414* (2022.01)
*H04N 1/00* (2006.01)
*G06V 30/416* (2022.01)
*G06V 30/10* (2022.01)

(52) U.S. Cl.
CPC .......... *G06V 30/414* (2022.01); *G06V 30/416* (2022.01); *H04N 1/00737* (2013.01); *H04N 1/00809* (2013.01); *G06V 30/10* (2022.01)

(58) Field of Classification Search
CPC .... G06V 30/10; G06V 30/414; G06V 30/416; H04N 1/00737; H04N 1/00809
USPC ......................................................... 382/176
See application file for complete search history.

(56) References Cited

U.S. PATENT DOCUMENTS

2008/0180708 A1\* 7/2008 Ouchi ...................... B41J 29/38
358/1.9
2018/0329993 A1\* 11/2018 Bedadala ............ G06F 16/1734

FOREIGN PATENT DOCUMENTS

| JP | 2008129791 | 6/2008 |
| JP | 2008129792 | 6/2008 |
| JP | 2013058092 | 3/2013 |

\* cited by examiner

*Primary Examiner* — Gabriel I Garcia
(74) *Attorney, Agent, or Firm* — JCIPRNET

(57) ABSTRACT

An information processing apparatus includes a processor configured to acquire an image, receive designation of a type of the image, present another type specified from the image in a case where the type does not satisfy a criterion corresponding to the image, and receive re-designation of a type of the image.

20 Claims, 20 Drawing Sheets

| IMAGE ID | USER ID | IMAGE READING APPARATUS ID | DATE AND TIME | TERMINAL ID | IMAGE DATA |
|---|---|---|---|---|---|
| G01 | U01 | C11 | ... | T21 | ... |
| G02 | U02 | C12 | ... | – | ... |
| G03 | U03 | C13 | ... | T23 | ... |
| ... | ... | ... | ... | ... | ... |

| QUESTION ID | LEARNING DATA |
|---|---|
| ... | ... |
| Q52 | ... |
| ... | ... |

Figure 11:
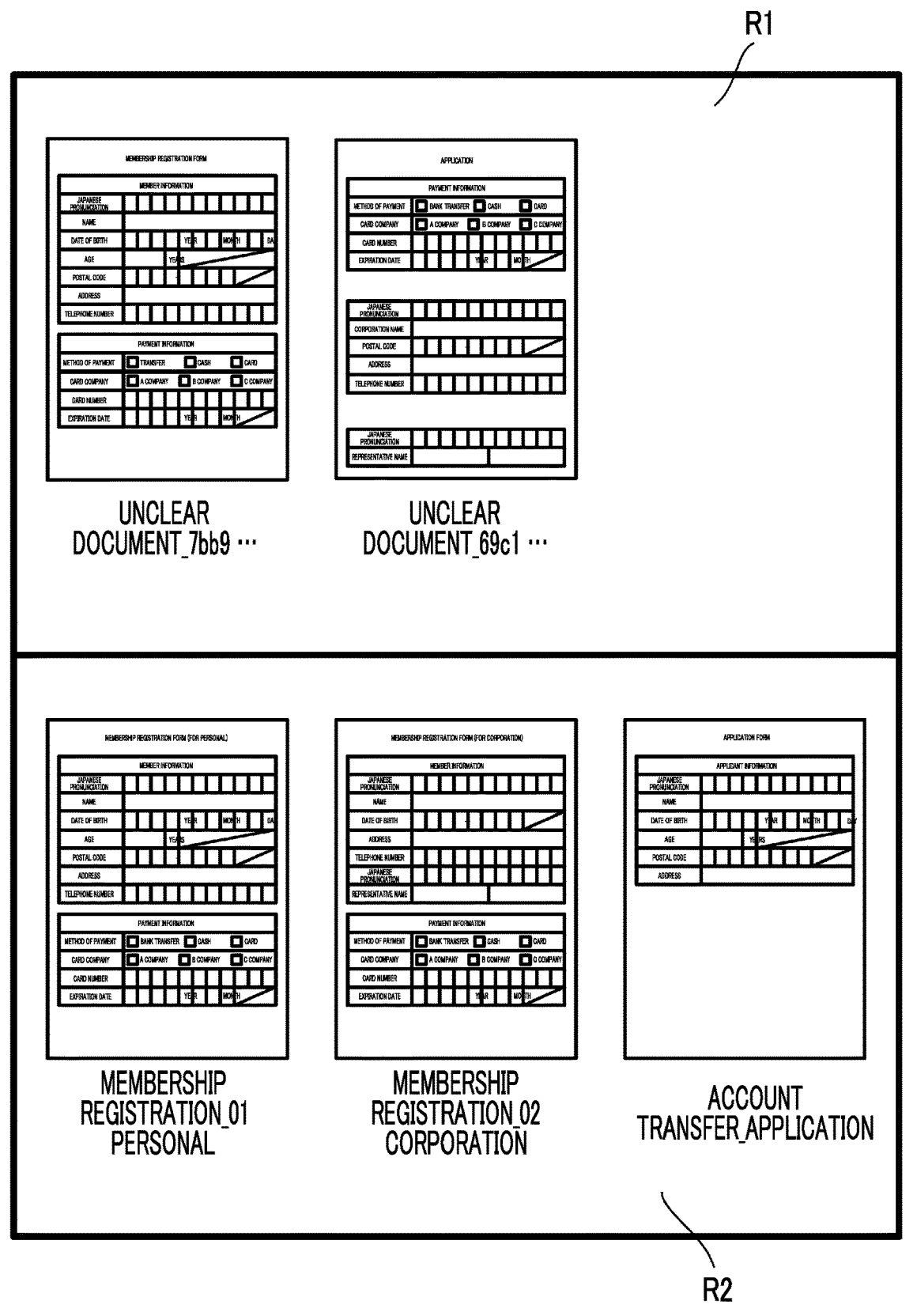

UNCLEAR DOCUMENT_7bb9 ···

UNCLEAR DOCUMENT_69c1 ···

MEMBERSHIP REGISTRATION_01 PERSONAL

MEMBERSHIP REGISTRATION_02 CORPORATION

ACCOUNT TRANSFER_APPLICATION

FIG. 14

PERSONAL MEMBERSHIP REGISTRATION FORM

MEMBER INFORMATION

| JAPANESE PRONUNCIATION | SUZUKI | ICHIRO | | |
|---|---|---|---|---|
| NAME | SUZUKI | ICHIRO | | |
| DATE OF BIRTH | YEAR | MONTH | DAY | |
| AGE | YEARS | | | |
| POSTAL CODE | - | | | |
| ADDRESS | 154-103, SEKITORI-CHO, MIZUHO-KU, NAGOYA-SHI | | | |
| TELEPHONE NUMBER | | | | |

PAYMENT INFORMATION

| METHOD OF PAYMENT | ☐ BANK TRANSFER | ☐ CASH | ☐ CARD |
| CARD COMPANY | ☐ A COMPANY | ☐ B COMPANY | ☐ C COMPANY |
| CARD NUMBER | | | |
| EXPIRATION DATE | YEAR | MONTH | |

MEMBERSHIP REGISTRATION FORM (FOR PERSONAL)

75% M

MEMBER INFORMATION

| JAPANESE PRONUNCIATION | | | | |
|---|---|---|---|---|
| NAME | | | | |
| DATE OF BIRTH | YEAR | MONTH | DAY | |
| AGE | YEARS | | | |
| POSTAL CODE | - | | | |
| ADDRESS | | | | |
| TELEPHONE NUMBER | | | | |

PAYMENT INFORMATION

| METHOD OF PAYMENT | ☐ BANK TRANSFER | ☐ CASH | ☐ CARD |
| CARD COMPANY | ☐ A COMPANY | ☐ B COMPANY | ☐ C COMPANY |
| CARD NUMBER | | | |
| EXPIRATION DATE | YEAR | MONTH | |

ADJUST IMAGE ~B11    PREVIOUS ~B12    NEXT ~B13    STOP ~B14    CONFIRM ~B15

FIG. 18

MEMBERSHIP REGISTRATION FORM (FOR PERSONAL)

| | MEMBER INFORMATION | | | | | | | | | |
|---|---|---|---|---|---|---|---|---|---|---|
| JAPANESE PRONUNCIATION | | | | | | | | | | |
| NAME | | | | | | | | | | |
| DATE OF BIRTH | | | YEAR | | | MONTH | | | DAY | |
| AGE | | YEARS | | | | | | | | |
| POSTAL CODE | | | - | | | | | | | |
| ADDRESS | | | | | | | | | | |
| TELEPHONE NUMBER | | | | | | | | | | |

P1 — (Japanese Pronunciation / Name / Date of Birth / Age region)

| | PAYMENT INFORMATION |
|---|---|
| METHOD OF PAYMENT | ☐ BANK TRANSFER ☐ CASH ☐ CARD |
| CARD COMPANY | ☐ A COMPANY ☐ B COMPANY ☐ C COMPANY |
| CARD NUMBER | |
| EXPIRATION DATE | YEAR MONTH |

P2 — (Method of Payment / Card Company region)

| ADD | DELETE | MOVE | MODIFY | THRESHOLD VALUE |
|---|---|---|---|---|
| B41 | B42 | B43 | B44 | B45 |

FIG. 19

INFORMATION PROCESSING APPARATUS FOR DESIGNATION OF IMAGE TYPE, IMAGE READING APPARATUS, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2020-058866 filed Mar. 27, 2020.

BACKGROUND

(i) Technical Field

The present invention relates to an information processing apparatus, an image reading apparatus, and a non-transitory computer readable medium storing a program.

(ii) Related Art

An information processing apparatus that executes optical character recognition processing on an image obtained by making an image reading apparatus read a document and recognizes the content described in the document. In general, a document is different in arrangement of read areas, such as entry fields, for each type. In the entry fields and the like included in the document, a rule is established for a kind, an order, or the like of text to be written. Accordingly, among the information processing apparatuses, an information processing apparatus is known that receives designation of a type of a document from a user and executes optical character recognition according to the type.

For example, JP2008-129791A discloses a document processing system that uses an optical character recognition function, extracts a feature from input text image data, compares the feature of the image with a plurality of pieces of image information registered in advance to identify a registration form from a most approximate result, and in a case where an unregistered document is recognized, describes specific text on a print sheet to automatically register a new form.

For example, JP2013-058092A discloses an information processing apparatus that acquires data obtained by classifying a plurality of pieces of image data into one or a plurality of groups, inspects one or each of the plurality of groups in acquired data based on group definition information, which establishes a condition for determining deficiency or excess of image data included in the group, to determine deficiency or excess of image data on each group, and displays information indicating a group where image data is deficient and image data that has not been classified into a group or has been determined to be excessively included in a group and for which a belonging group is undetermined.

SUMMARY

Incidentally, a document of a type different from a type designated by the user may be mixed up with a bundle of documents read by the image reading apparatus. In this case, the user should perform an operation to take off the mixed document from the bundle and to re-designate a type to make the image reading apparatus read the document again. This operation imposes a burden on the user.

Aspects of non-limiting exemplary embodiments of the present disclosure relate to an information processing apparatus, an image reading apparatus, and a non-transitory computer readable medium storing a program that, when the image reading apparatus reads an image of a type different from a designated type, or the like, reduces an operation burden on a user in resetting a type of the image compared to a case where another type specified from the image is not presented.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to acquire an image, receive designation of a type of the image, present another type specified from the image in a case where the type does not satisfy a criterion corresponding to the image, and receive re-designation of a type of the image.

BRIEF DESCRIPTION OF THE DRAWINGS

Exemplary embodiment(s) of the present invention will be described in detail based on the following figures, wherein:

FIG. 11 is a diagram showing an example of an operation screen on which a user selects a target image;

FIG. 14 is a diagram showing an example of an operation screen on which an image indicating a re-designated type and the target image are displayed in an arranged manner;

FIG. 18 is a diagram showing an example of an operation screen on which a patch is corrected in a document definition;

FIG. 19 is a diagram showing an example of an operation screen on which ruled lines are corrected in a document definition;

DETAILED DESCRIPTION

Exemplary Embodiment

<Configuration of Information Processing System>

Figure 1:
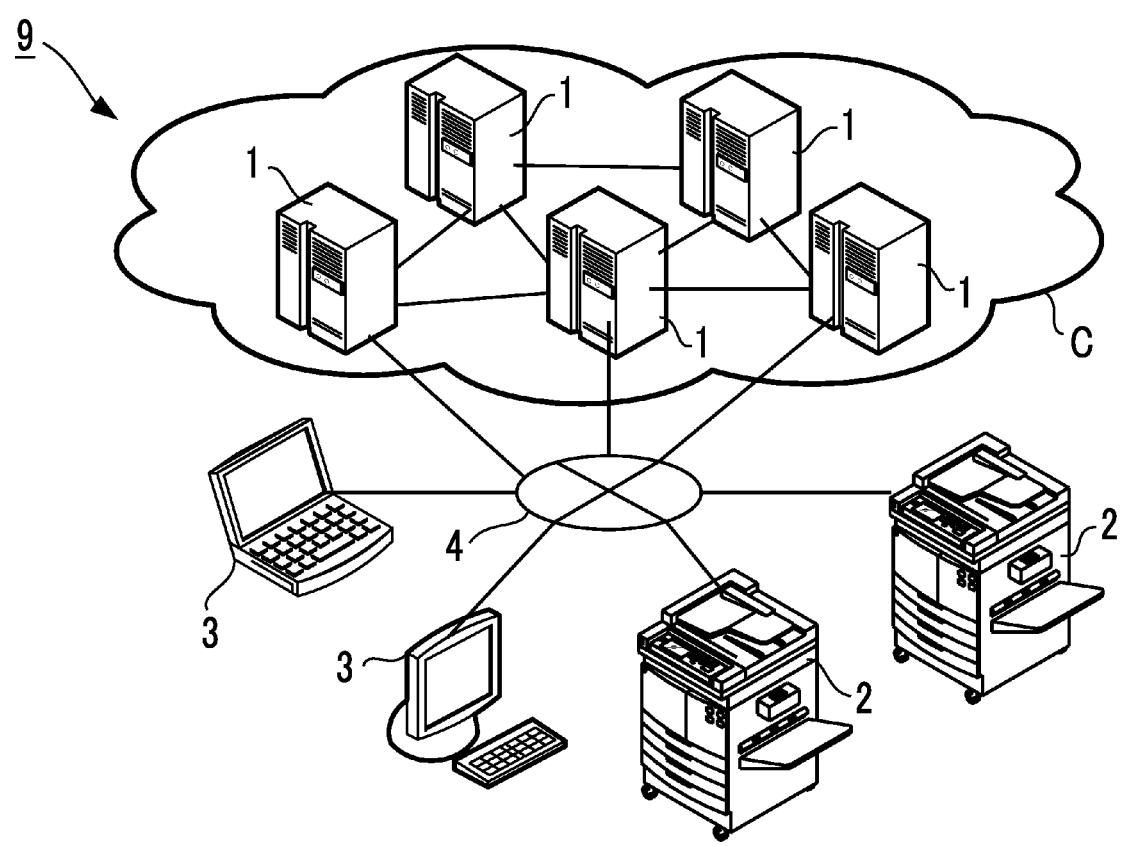
FIG. 1 is a diagram showing an example of the overall configuration of an information processing system 9.

FIG. 1 is a diagram showing an example of the overall configuration of an information processing system 9. The information processing system 9 shown in FIG. 1 is a system that executes optical character recognition processing (OCR) on an image obtained by reading a document while designating a type of the document and digitalizes text and the like written in the document. As shown in FIG. 1, the information processing system 9 has an information processing apparatus 1, an image reading apparatus 2, a terminal 3, and a communication line 4.

The image reading apparatus 2 is, for example, an apparatus that optically reads a document to generate image data indicating the read image. The image reading apparatus 2 supplies image data to an external apparatus through the communication line 4. The image reading apparatus 2 may have a function of forming an image on a medium.

The terminal 3 is a terminal apparatus that is used by each user of the information processing system 9, and is, for example, a personal computer, such as a desktop type, a notebook type, or a tablet type. The terminal 3 receives an operation of the user and gives an instruction according to the operation to the image reading apparatus 2 and the information processing apparatus 1. The terminal 3 is used by each user performing an operation on the image reading apparatus 2 shared by a plurality of users at each timing. In a case where the user directly operates the image reading apparatus 2, the information processing system 9 may not have the terminal 3.

The information processing apparatus 1 is, for example, a computer, and is a server apparatus that responds to a request of the image reading apparatus 2 or the terminal 3, which is a client apparatus. The information processing system 9 shown in FIG. 1 has a plurality of information processing apparatuses 1. The plurality of information processing apparatuses 1 configure a cloud C by dynamically sharing functions. The cloud C attaches a unique document name to each piece of image data indicating an image read by the image reading apparatus 2 and stores image data. In a case where the cloud C is configured, any one of the plurality of information processing apparatuses 1 may function as a so-called load balancer that monitors processing loads of other information processing apparatuses 1 and performs processing allocation.

The communication line 4 is a line that connects the information processing apparatus 1, the image reading apparatus 2, and the terminal 3 in a communicable manner. The communication line 4 may be, for example, a local area network (LAN), a wide area network (WAN), the Internet, or a combination thereof. The communication line 4 may include public switched telephone networks (PSTN), an integrated services digital network (ISDN), or the like.

The number of each of information processing apparatuses 1, image reading apparatuses 2, terminals 3, and communication lines 4 in the information processing system 9 is not limited to the example shown in FIG. 1, and may be one or plural.

<Configuration of Information Processing Apparatus>

Figures 2, 3:
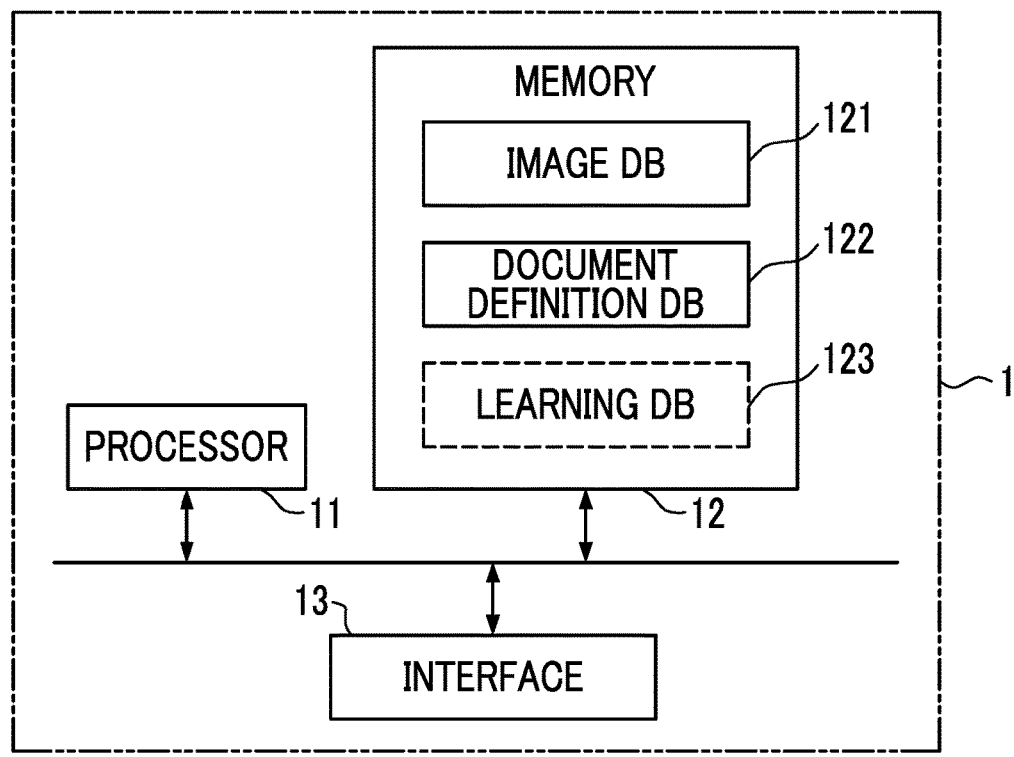
FIG. 2 is a diagram showing an example of the configuration of an information processing apparatus 1.
FIG. 3 is a diagram showing an example of an image DB 121.

FIG. 2 is a diagram showing an example of the configuration of the information processing apparatus 1. The information processing apparatus 1 shown in FIG. 2 has a processor 11, a memory 12, and an interface 13. The configurations of the units are connected by, for example, a bus in a communicable manner.

The processor 11 controls the units of the information processing apparatus 1 by reading and executing a computer program (hereinafter, simply referred to as a program) stored in the memory 12. The processor 11 is, for example, a central processing unit (CPU).

The interface 13 is a communication circuit that connects the information processing apparatus 1 to the image reading apparatus 2 and the terminal 3 through the communication line 4 in a communicable manner by wire or wireless.

The memory 12 is a storage unit that stores an operating system, various programs, data, and the like to be load into the processor 11. The memory 12 has a random access memory (RAM) or a read only memory (ROM). The memory 12 may have a solid state drive, a hard disk drive, or the like.

The memory 12 stores an image DB 121 and a document definition DB 122. In addition, the memory 12 shown in FIG. 2 stores a learning DB 123.

FIG. 3 is a diagram showing an example of the image DB 121. The image DB 121 shown in FIG. 3 is a database that stores respective image data supplied from the image reading apparatuses 2. An image ID shown in FIG. 3 is identification information for identifying each supplied image data. A user ID shown in FIG. 3 is identification information for identifying each user who operates, for example, the terminal to make the image reading apparatus 2 supply the above-described image data. An image reading apparatus ID shown in FIG. 3 is identification information for identifying each image reading apparatus 2 that supplies the above-described image data. Date and time shown in FIG. 3 is information indicating date and time on which the above-described image data is supplied or generated. A terminal ID shown in FIG. 3 is identification information of the terminal 3 in a case where the user operates the terminal to make the image reading apparatus 2 supply the above-described image data to the information processing apparatus 1. The user may directly operate the image reading apparatus 2 to supply the above-described image data to the information processing apparatus 1. In this case, indicating that the terminal ID is not present is written in the terminal ID shown in FIG. 3.

Figure 4:
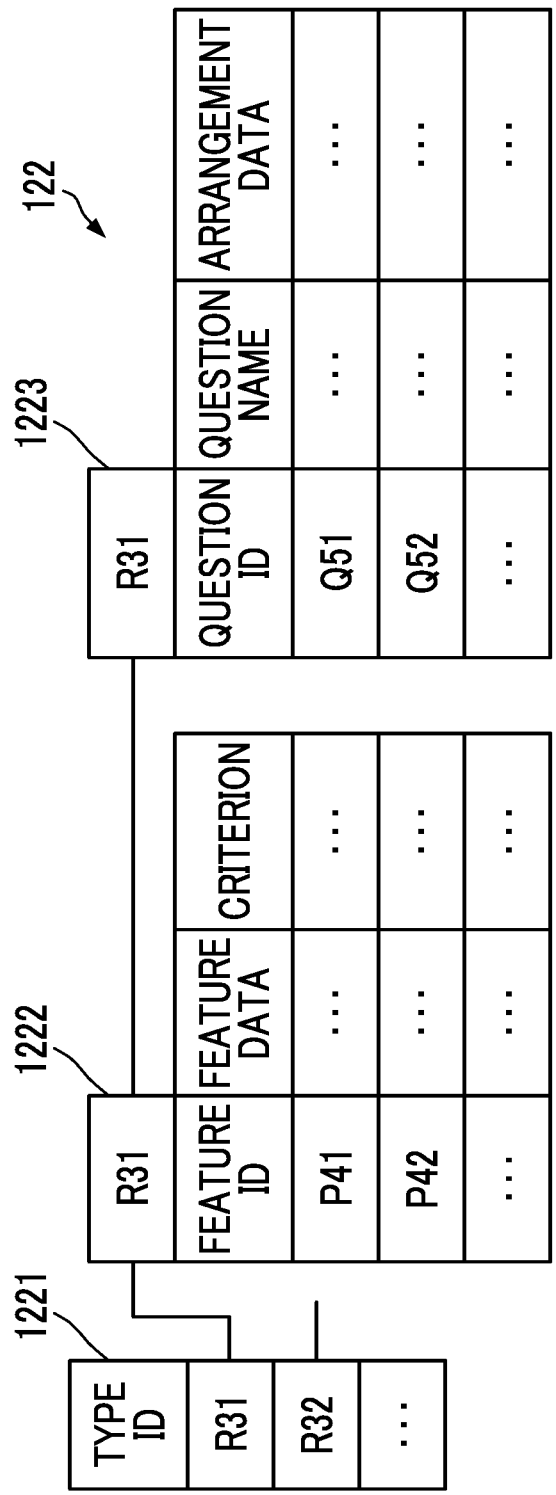
FIG. 4 is a diagram showing an example of a document definition DB 122.

FIG. 4 is a diagram showing an example of the document definition DB 122. The document definition DB 122 is a database that, for each document type, stores a feature of the document and a criterion to be satisfied by an image in the document in association with each other. In the document definition DB 122 shown in FIG. 4, for each type of document, "question" through which a writer is guided to write a response in the document is defined.

The document definition DB 122 shown in FIG. 4 has a type list 1221, a feature table 1222, and a question table 1223. The type list 1221 is a list of type IDs. A type ID is identification information for identifying a type of a document.

The feature table 1222 is a table that is provided for each type of document, and stores a feature provided in the document of the type. In the feature table 1222, a feature ID is identification information of the above-described feature. The feature table 1222 stores, for each feature ID, feature data indicating the content of a feature identified by the feature ID and a criterion to be satisfied in feature by an image in association with each other.

The feature stated herein is indicated by, for example, the number of ruled lines forming an entry field in a document, the arrangement of the ruled lines, the thickness of the ruled lines, or the like. The feature may be indicated by the arrangement of a "patch" configured of a unique image group included in the document, the shape of the patch, or the size of the patch. The patch is, for example, an image group having text indicating a title, a question, or the like, a logo mark indicating a company, or the like.

The criterion stated herein is a criterion of each feature to be satisfied in a case where a read image is a document of a type indicated by a type ID. For example, in a case where a feature is given by a scalar value having one numerical value, a criterion is a threshold value, a range, or the like, and in a case where a feature is given by a vector value having a set of a plurality of numerical values, a criterion is a conditional expression using the set, or the like.

The question table 1223 is a table that is provided for each type of document, and stores a question provided in the document of the type. In the question table 1223, a question ID is identification information of a question, and a question name is a name of the question. Arrangement data is information indicating the arrangement of a question and a corresponding entry field.

Figures 5, 6:
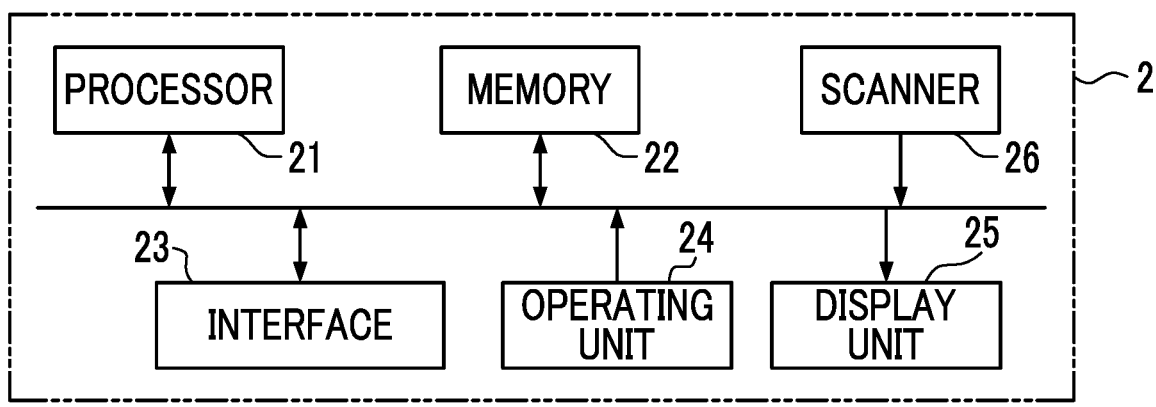
FIG. 5 is a diagram showing an example of a learning DB 123.
FIG. 6 is a diagram showing an example of the configuration of an image reading apparatus 2.

FIG. 5 is a diagram showing an example of the learning DB 123. The learning DB 123 shown in FIG. 5 is a database that stores learning data for improving a recognition rate in recognizing text written to a question included in a document in handwriting or the like. Learning data is generated, for example, by collecting a recognition result of handwritten text and a correct answer. Learning data may store, for each question, identification information of dictionaries (not shown in FIG. 5) to be used, a priority to use the dictionaries, or the like. A dictionary is a database that associates the shape of handwritten text with words indicated by the shape, and examples of the dictionaries include an address dictionary, a biographical dictionary, a numeral dictionary, an alphabet dictionary, and the like.

<Configuration of Image Reading Apparatus>

FIG. 6 is a diagram showing an example of the configuration of the image reading apparatus 2. The image reading apparatus 2 shown in FIG. 6 has a processor 21, a memory 22, an interface 23, an operating unit 24, a display unit 25, and a scanner 26. The configurations of the units are connected by, for example, a bus in a communicable manner.

The processor 21 controls the units of the image reading apparatus 2 by reading and executing the programs stored in the memory 22. The processor 21 is, for example, a CPU.

The memory 22 is a storage unit that stores an operating system, various programs, data, and the like to be load into the processor 21. The memory 22 has a RAM or a ROM. The memory 22 may have a solid state drive, a hard disk drive, or the like.

The interface 23 is a communication circuit that connects the image reading apparatus 2 to the terminal 3 and the information processing apparatus 1 through the communication line 4 in a communicable manner by wire or wireless.

The operating unit 24 includes operators, such as operation buttons, operation keys, and a touch panel for giving various instructions. The operating unit 24 receives an operation and sends a signal according to the operation content to the processor 21.

In a case where each user operates the image reading apparatus 2 from the terminal 3, the image reading apparatus 2 may not include the operating unit 24.

The display unit 25 has a display screen, such as a liquid crystal display, and displays an image under the control of the processor 21. A transparent touch panel of the operating unit 24 may be disposed on the display screen in a superimposed manner.

The scanner 26 optically reads an image indicating a document and generates image data indicating the image under the control of the processor 21.

<Configuration of Terminal>

Figure 7:
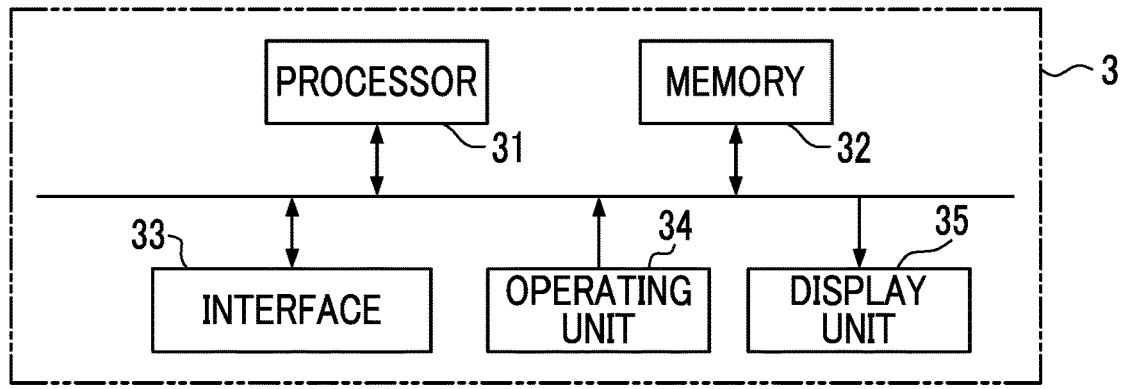
FIG. 7 is a diagram showing an example of the configuration of a terminal 3.

FIG. 7 is a diagram showing an example of the configuration of the terminal 3. The terminal 3 shown in FIG. 7 has a processor 31, a memory 32, an interface 33, an operating unit 34, and a display unit 35. The configurations of the units are connected by, for example, a bus in a communicable manner.

The processor 31 controls the units of the terminal 3 by reading and executing the programs stored in the memory 32. The processor 31 is, for example, a CPU.

The interface 33 is a communication circuit that connects the terminal 3 to the image reading apparatus 2 and the information processing apparatus 1 through the communication line 4 in a communicable manner by wire or wireless.

The operating unit 34 includes operators, such as operation buttons, a keyboard, a touch panel, and a mouse for giving various instructions. The operating unit 34 receives an operation and sends a signal according to the operation content to the processor 31.

The display unit 35 has a display screen, such as a liquid crystal display, and displays an image under the control of the processor 31. A transparent touch panel of the operating unit 34 may be disposed on the display screen in a superimposed manner.

The memory 32 is a storage unit that stores an operating system, various programs, data, and the like to be load into the processor 31. The memory 32 has a RAM or a ROM. The memory 32 may have a solid state drive, a hard disk drive, or the like.

<Functional Configuration of Information Processing Apparatus>

Figure 8:
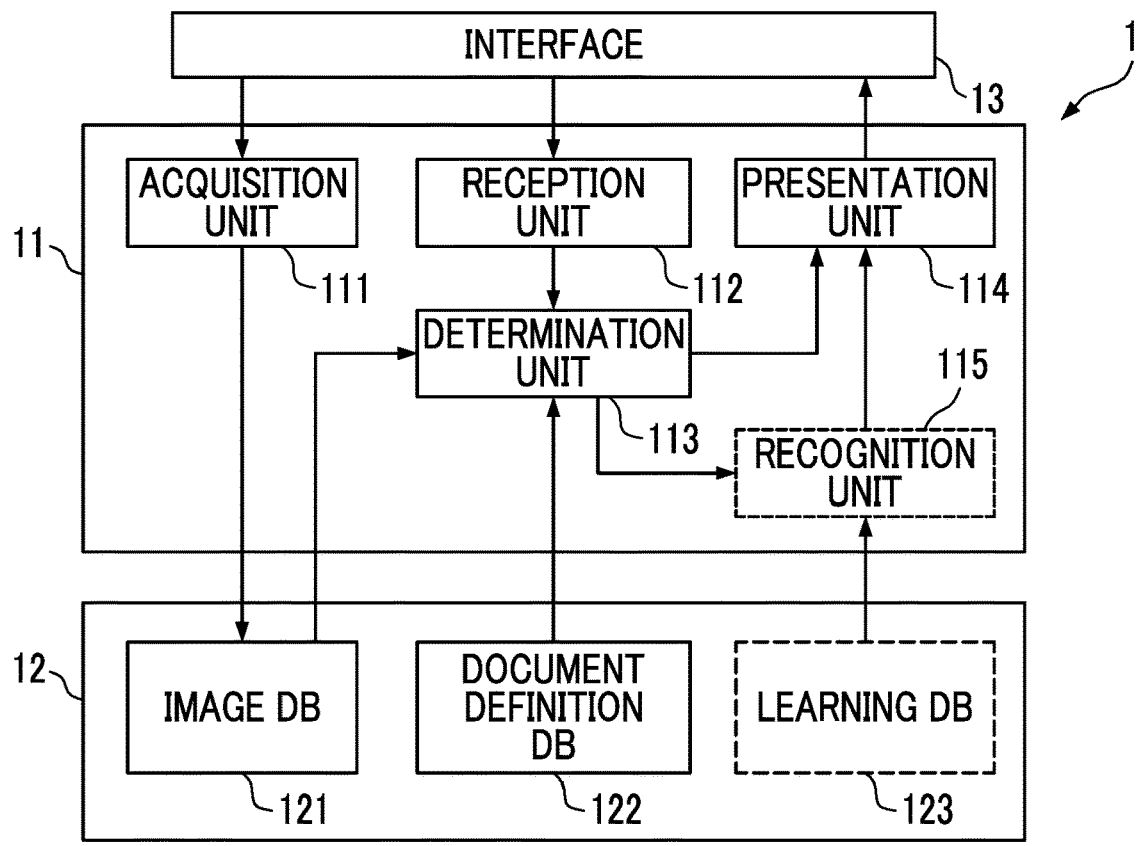
FIG. 8 is a diagram showing an example of the functional configuration of the information processing apparatus 1.

FIG. 8 is a diagram showing an example of the functional configuration of the information processing apparatus 1. The processor 11 of the information processing apparatus 1 executes the programs stored in the memory 12, thereby functioning as an acquisition unit 111, a reception unit 112, a determination unit 113, and a presentation unit 114. The processor 11 shown in FIG. 8 also functions as a recognition unit 115.

The acquisition unit 111 acquires image data indicating the image read by the scanner 26 in the image reading apparatus 2 from the image reading apparatus 2 through the interface 13 and the communication line 4. The acquisition unit 111 stores the acquired image data indicating the image in the image DB 121 of the memory 12. That is, the processor 11 that functions as the acquisition unit 111 is an example of a processor that acquires an image read by a scanner.

The reception unit 112 receives user's designation of a type of a document indicated by the read image from the terminal 3 through the interface 13 and the communication line 4. That is, the processor 11 that functions as the reception unit 112 is an example of a processor that receives designation of a type of an image.

The determination unit 113 reads the image data acquired by the acquisition unit 111 from the image DB 121 of the memory 12 and determines whether or not the image indicated by the image data satisfies a criterion corresponding to the type indicated by the designation received by the reception unit 112. Then, in a case where determination is made that the above-described image does not satisfy the above-described criterion, the determination unit 113 specifies another type different from the designated type from the image and delivers a list of other types to the presentation unit 114.

In a case where the determination unit 113 determines that the image indicated by the image data acquired by the acquisition unit 111 does not satisfy the criterion corresponding to the type indicated by the designation received by the reception unit 112, the presentation unit 114 receives the list of other types from the determination unit 113 and instructs the terminal 3 or the image reading apparatus 2 to present the list through the interface 13 and the communication line 4. That is, in a case where the image indicated by the image data does not satisfy the criterion corresponding to the type indicated by the designation, the processor 11 that functions as the determination unit 113 and the presentation unit 114 is an example of a processor that presents another type specified from the image.

In a case where the presentation unit 114 presents another type, the reception unit 112 receives re-designation of a type of the above-described image from the user who views the presentation content. That is, the processor 11 that functions as the reception unit 112 is an example of a processor that receives re-designation of a type of an image.

In a case where determination is made that the image indicated by the image data acquired by the acquisition unit 111 satisfies the criterion corresponding to the type indicated by the designation received by the reception unit 112, the determination unit 113 processes the image as the document of the type. For example, in a case shown in FIG. 8, the determination unit 113 specifies the arrangement of an entry field with a response to a question in the image using the question table 1223 read from the document definition DB 122 and makes the recognition unit 115 recognize handwritten text or the like written in the entry field.

The recognition unit 115 executes optical character recognition processing on an image of the entry field using learning data corresponding to the question of the above-described entry field with reference to the learning DB 123 and recognizes the handwritten text or the like.

<Operation of Information Processing Apparatus>
<Operation to Determine Whether or Not Image Satisfies Criterion>

Figure 9:
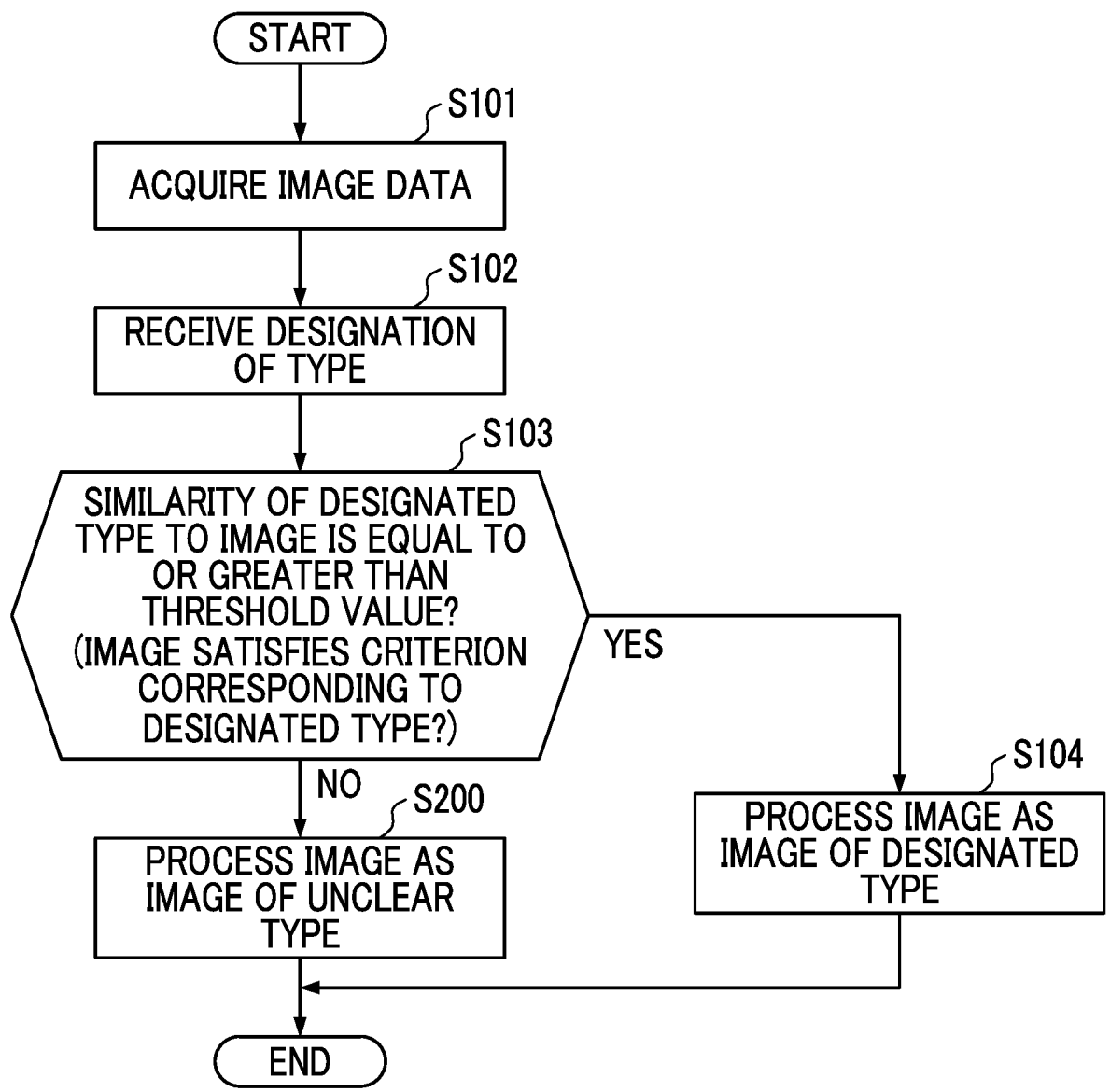
FIG. 9 is a flowchart showing an example of a flow of an operation to determine whether or not an image satisfies a criterion.

FIG. 9 is a flowchart showing an example of a flow of an operation to determine whether or not an image satisfies a criterion. Through the operation, the processor 11 of the information processing apparatus 1 determines whether or not the image indicated by the acquired image data satisfies the criterion corresponding to the type indicated by the received designation.

The processor 11 acquires the image data indicating the image read by the scanner 26 from the image reading apparatus 2 through the interface 13 and the communication line 4 (Step S101). The processor 11 receives designation of a type from the terminal 3 through the interface 13 and the communication line 4 (Step S102). In a case where the user directly operates the image reading apparatus 2, the processor 11 receives the designation of the type from the image reading apparatus 2 through the interface 13 and the communication line 4.

The processor 11 specifies the image (hereinafter, referred to as an acquired image) indicated by the acquired image data and the type (hereinafter, referred to as a designated type) indicated by the received designation, and determines whether or not the acquired image satisfies the criterion corresponding to the designated type (Step S103). For example, in the operation shown in FIG. 9, the processor 11 calculates a similarity of the designated type to the acquired image and determines whether or not the similarity is equal to or greater than a threshold value defined in the criterion of the designated type.

In a case where determination is made that the calculated similarity is equal to or greater than the threshold value defined in the criterion of the designated type (Step S103; YES), the processor 11 processes the acquired image as an image of the designated type (Step S104). For example, the processor 11 cuts the entry field for the question provided in the document of the designated type from the acquired image, executes optical character recognition processing, and specifies text data corresponding to text indicated by the handwritten text or the like.

On the other hand, in a case where determination is made that the calculated similarity is not equal to or greater than the threshold value defined in the criterion of the designated type (Step S103; NO), the processor 11 processes the acquired image as an image of an unclear type (Step S200).

<Operation to Process Acquired Image as Image of Unclear Type>

Figure 10:
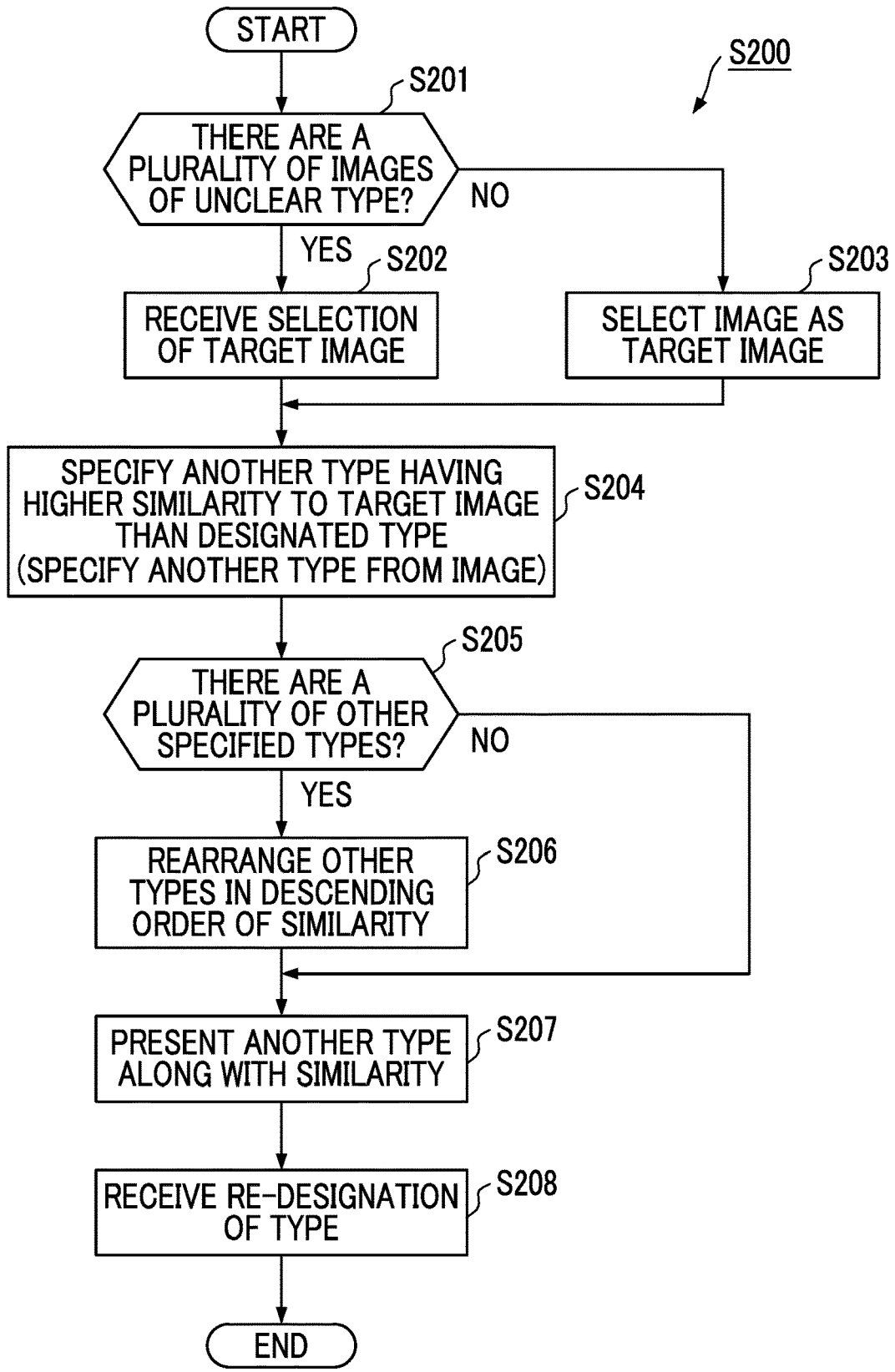
FIG. 10 is a flowchart showing an example of a flow of an operation to process an acquired image as an image of an unclear type.

FIG. 10 is a flowchart showing an example of a flow of an operation to process an acquired image as an image of an unclear type. The operation shown in FIG. 10 is a detailed operation of Step S200 in the flowchart shown in FIG. 9.

The processor 11 of the information processing apparatus 1 determines whether or not there are a plurality of images of unclear types (Step S201), and in a case where determination is made that there are a plurality of images of unclear types (Step S201; YES), receives user's selection of an image from the terminal 3 or the image reading apparatus 2 (Step S202). An image to be selected is an image (hereinafter, referred to as a target image) that is a target in specifying "another type" different from the designated type.

FIG. 11 is a diagram showing an example of an operation screen on which the user selects a target image. In a selection area R1 shown in FIG. 11, images that do not satisfy the criterion corresponding to the designated type are displayed. In a type re-designation area R2 shown in FIG. 11, candidates of "another type" different from the designated type to be re-designated for the images shown in the selection area R1 are displayed.

The candidates of "another type" may be images indicating the candidates of "another type". In this case, the processor 11 displays, on an identical screen, the images indicating the candidates of "another type" and the images of the unclear types, whereby the user easily specifies "another type" corresponding to the images of the unclear types. For example, the terminal 3 receives an instruction to display the operation screen shown in FIG. 11 from the information processing apparatus 1 and makes the display unit 35 of the terminal 3 display the operation screen. With this, the information processing apparatus 1 receives user's selection of a target image in the selection area R1 displayed on the display unit 35 of the terminal 3. In a case where the user directly operates the image reading apparatus 2, the processor 11 may transmit the instruction to display the operation screen shown in FIG. 11 to the image reading apparatus 2.

That is, the processor 11 in this case is an example of a processor that performs control such that, for example, the display unit 35 of the terminal 3, or the like displays, on an identical screen, the acquired image and an image corresponding to another type specified from the image.

On the other hand, in a flowchart shown in FIG. 10, in a case where determination is made that there are no plurality of images of unclear types, that is, there is one image of an unclear type (Step S201; NO), the processor 11 selects one image of the unclear type as a target image (Step S203).

In a case where the target image is decided, the processor 11 specifies another type from the target image (Step S204). For example, in a case shown in FIG. 10, the processor 11 specifies another type having a higher similarity to the target image than the designated type.

Then, the processor 11 determines whether or not there are a plurality of specified other types (Step S205), in a case where determination is made that there are a plurality of specified other types (Step S205; YES), rearranges the other types in a descending order of the similarity to the target image (Step S206), and progresses the process to Step S207. On the other hand, in a case where determination is made that there are no plurality of specified other types (Step S205; NO), the processor 11 does not execute Step S206 and progresses the process to Step S207.

The processor 11 presents the specified another type along with information indicating the similarity (Step S207). That is, the processor 11 that presents the above-described other type is an example of a processor that, in a case where determination is made that the image is an image of an unclear type with determination that the similarity of the type (that is, the designated type) indicated by the received designation to the acquired image is not equal to or greater than the threshold value, presents another type having a higher similarity to the image than the designated type.

The processor 11 that presents another type along with information indicating the similarity is an example of a processor that presents information indicating the similarity of another type to the target image in a case where the image indicated by the image data does not satisfy the criterion corresponding to the type indicated by the designation.

In a case where there are a plurality of specified other types, since the processor 11 rearranges the other types in a descending order of the similarity to the target image, the plurality of other types are presented in a descending order of the similarity. That is, the processor 11 is an example of a processor that, in a case where there are a plurality of other types, presents each of the other types in a descending order of the similarity of each of the other types to the target image.

Then, the processor 11 that presents another type specified from the target image receives user's re-designation of a type from the terminal 3 or the image reading apparatus 2 through the interface 13 and the communication line 4 (Step S208).

Figure 12:
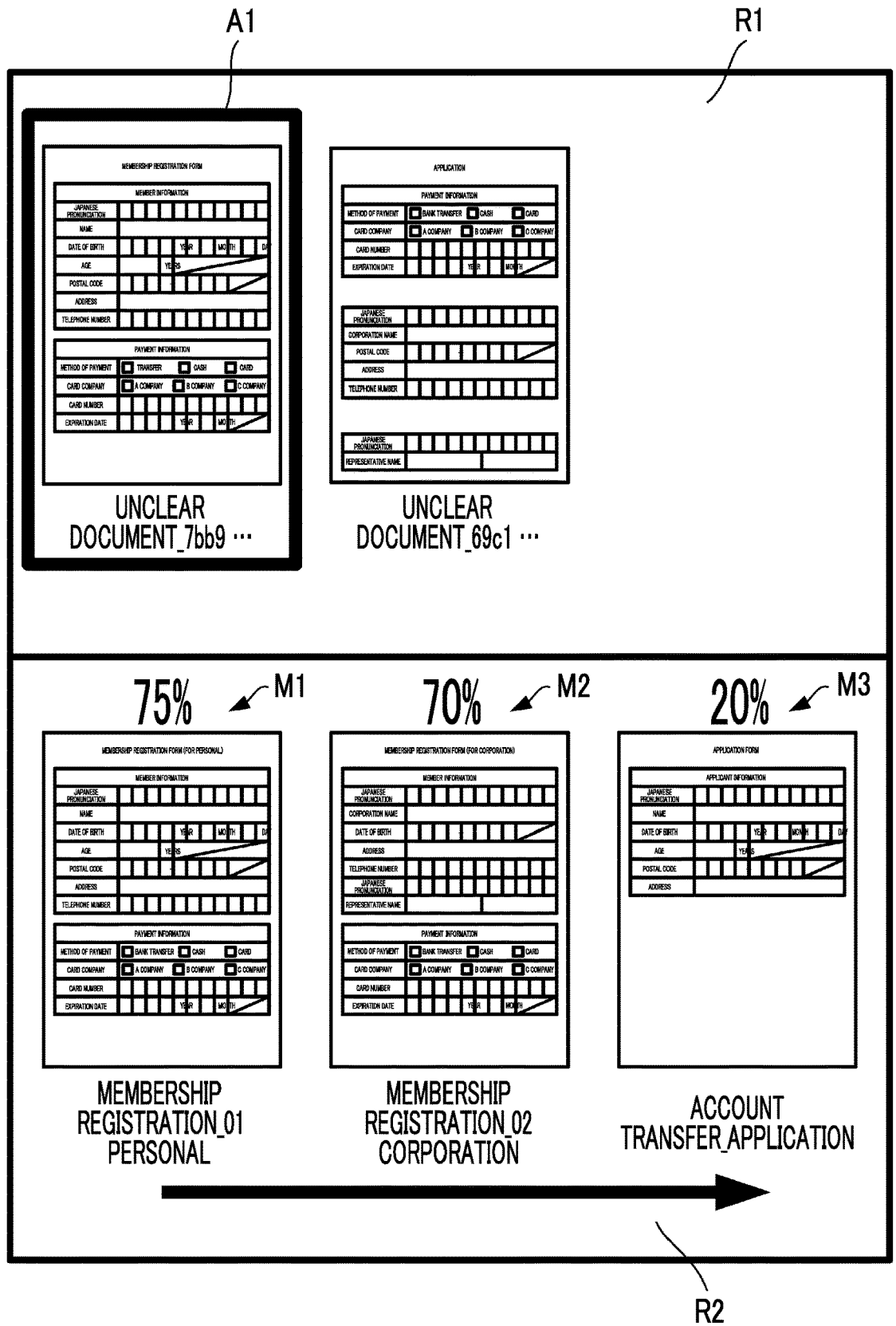
FIG. 12 is a diagram showing an example of an operation screen on which re-designation of a type is received from the user.

FIG. 12 is a diagram showing an example of an operation screen on which re-designation of a type is received from the user. In FIG. 12, in the selection area R1, two images that do not satisfy the criterion corresponding to the designated type are displayed in an arranged manner on right and left sides. In a case where the user selects the left image between the images, a frame A1 indicating that the image is selected as the target image is displayed.

Then, in a case where the frame A1 is displayed, in the type re-designation area R2 of the operation screen, other types having a higher similarity to the target image surrounded by the frame A1 than the designated type are displayed. In FIG. 12, three types are displayed as "another type" to be a candidate of re-designation, and the other types are displayed in association with evaluation information M1, M2, and M3, respectively. Each piece of the evaluation information M1, M2, and M3 is information indicating a similarity of "another type" to the target image, and is a text string indicating the similarity. Then, the three kinds of "another types" are displayed in an arranged manner in a descending order of the similarity from left to right along an arrow direction. The user confirms "another type" displayed in the type re-designation area R2 through the terminal 3, and selects any one of the other types by a click of a mouse, a touch pad, or the like. The information processing apparatus 1 receives a control signal according to the user's selection, thereby receiving user's re-designation of a type corresponding to the target image.

<Operation when Re-Designation of Type is Received>

Figure 13:
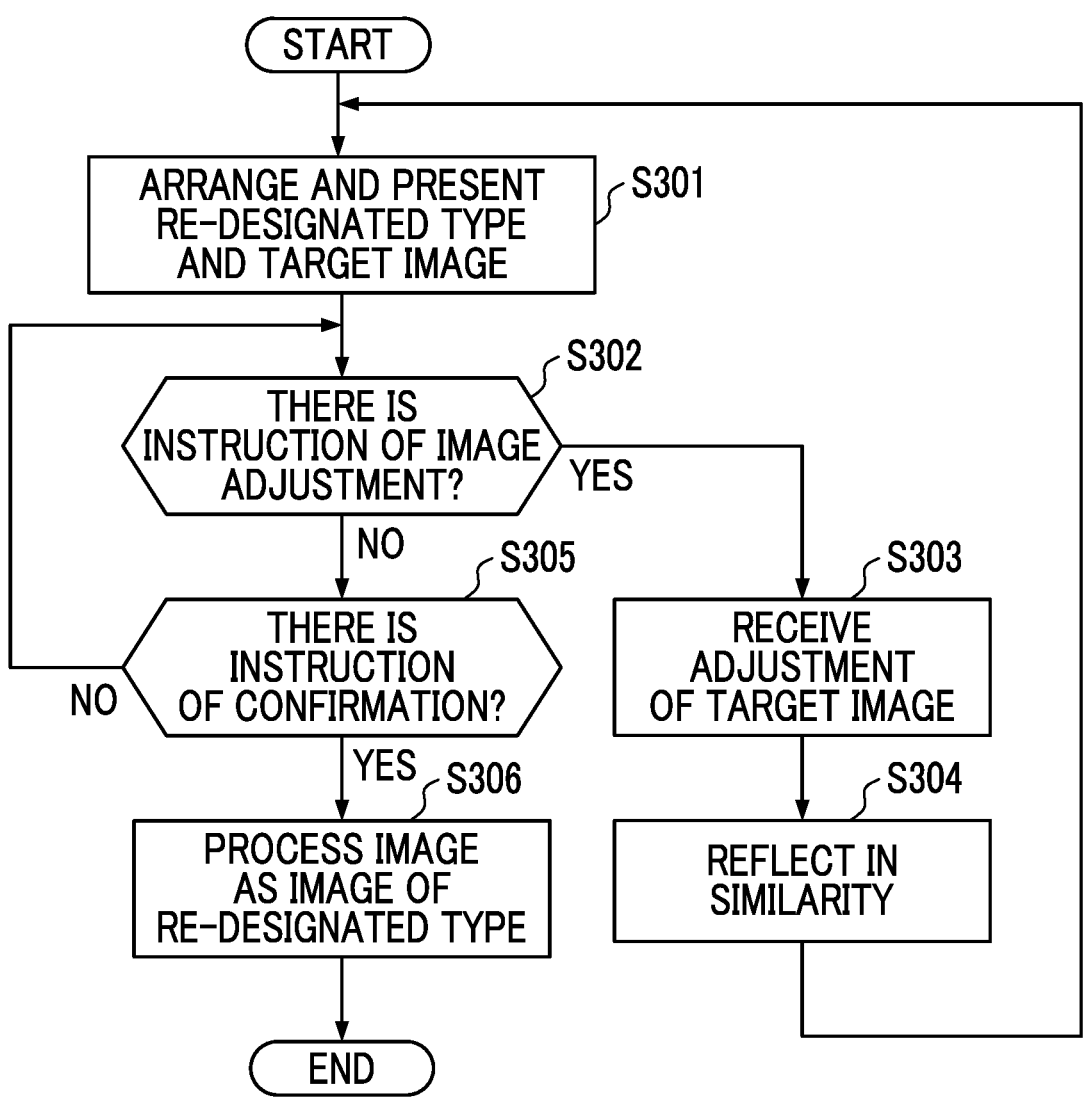
FIG. 13 is a flowchart showing an example of a flow of an operation when re-designation of a type is received.

FIG. 13 is a flowchart showing an example of a flow of an operation when re-designation of a type is received. The processor 11 of the information processing apparatus 1 instructs the terminal 3 to present an image indicating the re-designated type and the target image in an arranged manner (Step S301).

FIG. 14 is a diagram showing an example of an operation screen on which the image indicating the re-designated type and the target image are displayed in an arranged manner. The user views the operation screen shown in FIG. 14 to compare whether or not the re-designated type with the target image, thereby examining whether or not the target image is an image belonging to the re-designated type. On the operation screen shown in FIG. 14, evaluation information M indicating an evaluation of the target image in the criterion corresponding to the re-designated type is displayed on the image indicating the re-designated type in a superimposed manner. Here, the evaluation information M is an image in which a text string indicating the similarity of the re-designated type to the target image is written in a balloon frame. In the example of FIG. 14, the text string is "75%".

On the operation screen shown in FIG. 14, a button B11 with a text string "adjust image", a button B12 with a text string "previous", a button B13 with a text string "next", a button B14 with a text string "stop", and a button B15 with a text string "OK" are included. Each of the buttons receives an operation from the user.

The button B11 is a button for receiving an operation to adjust an image from the user. The button B12 is a button for moving a selection target to "previous" as viewed from the re-designated type in the list of other types displayed in an arranged manner in the type re-designation area R2 shown in FIG. 12. The button B13 is a button for moving the selection target to "next" in the above-described list. The button B14 is a button for stopping an operation on the operation screen shown in FIG. 14 and returning the process to the operation screen shown in FIG. 12. The button B15 is a button for determining the type of the target image to the re-designated type.

The processor 11 monitors a control signal received from the terminal 3 and determines whether or not there is an instruction to adjust an image in the operation signal (Step S302). In a case where determination is made that there is an instruction to adjust the target image in the control signal received from the terminal 3 (Step S302; YES), the processor 11 receives adjustment of the target image (Step S303). That is, the processor 11 that executes Step S303 is an example of a processor that receives adjustment of the image in a case where the acquired image does not satisfy the criterion corresponding to the designated type.

Figure 15:
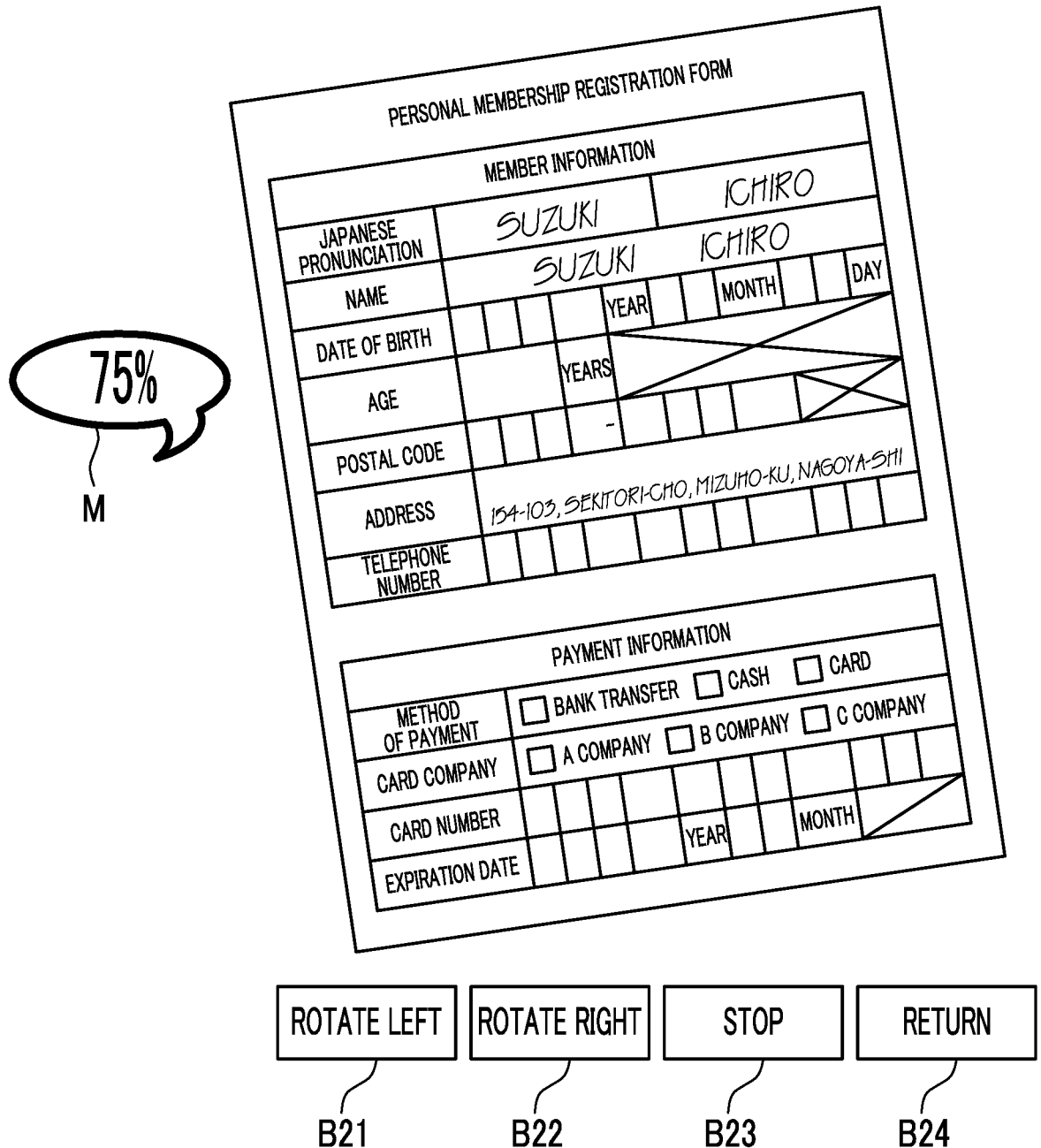
FIG. 15 is a diagram showing an example of an operation screen on which adjustment of the target image is received.

FIG. 15 is a diagram showing an example of an operation screen on which the adjustment of the target image is received. In a case where the user presses the button B11 on the operation screen of FIG. 14, the operation screen shown in FIG. 15 is displayed on the terminal 3 of the user. In a case where, for example, a so-called automatic document feeder (ADF) is provided in the image reading apparatus 2, an image read by the scanner 26 may be inclined due to deviation of a transport direction of the document by the automatic document feeder. For example, even though the user places documents at a reading position of the scanner 26 one by one, an image may be inclined. The operation screen shown in FIG. 15 is a screen for rotating and adjusting the target image.

On the operation screen shown in FIG. 15, a button B21 with a text string "rotate left", a button B22 with a text string "rotate right", a button B23 with a text string "stop", and a button B24 with a text string "return" are included.

The button B21 is a button for rotating the target image left. The button B22 is a button for rotating the target image right. The button B23 is a button for stopping an operation for stopping an operation on the operation screen shown in FIG. 15 and returning the process to the operation screen shown in FIG. 14. The button B24 is a button for saving a result of rotating the target image right or left to adjust the target image and returning the process to the operation screen shown in FIG. 14.

Information indicating a similarity of the re-designated type to the rotated target image displayed is displayed in the evaluation information M on the operation screen shown in FIG. 15 along with the target image temporarily rotated by an operation. The user gives an instruction of right or left rotation with reference to a numerical value of the similarity indicated in the evaluation information M.

In the flowchart shown in FIG. 13, in a case where the adjustment of the target image is received, the processor 11 recalculates a similarity of the re-designated type to the adjusted target image, reflects the recalculated similarity in a similarity to be displayed (Step S304), and returns the process to Step S301. With this, as shown in FIG. 14, the operation screen on which the image indicating the re-designated type and the adjusted target image are displayed in an arranged manner is displayed on the display unit 35 of the terminal 3 again. That is, the processor 11 is an example of a processor that performs control such that, for example, the display unit 35 of the terminal 3, or the like displays an evaluation of the adjusted image in the criterion corresponding to the designated type or the presented another type.

On the other hand, in a case where determination is made that there is no instruction to adjust the target image in the control signal received from the terminal 3 (Step S302; NO), the processor 11 determines whether or not there is an instruction to determine the type of the target image to the re-designated type (Step S305). In a case where determination is made that there is no instruction to determine the type of the target image to the re-designated type (Step S305; NO), the processor 11 returns the process to Step S302.

On the other hand, in a case where determination is made that there is an instruction to determine the type of the target image to the re-designated type (Step S305; YES), the processor 11 processes the target image as an image of the re-designated type (Step S400).

<Operation to Process Target Image as Image of Re-Designated Type>

Figure 16:
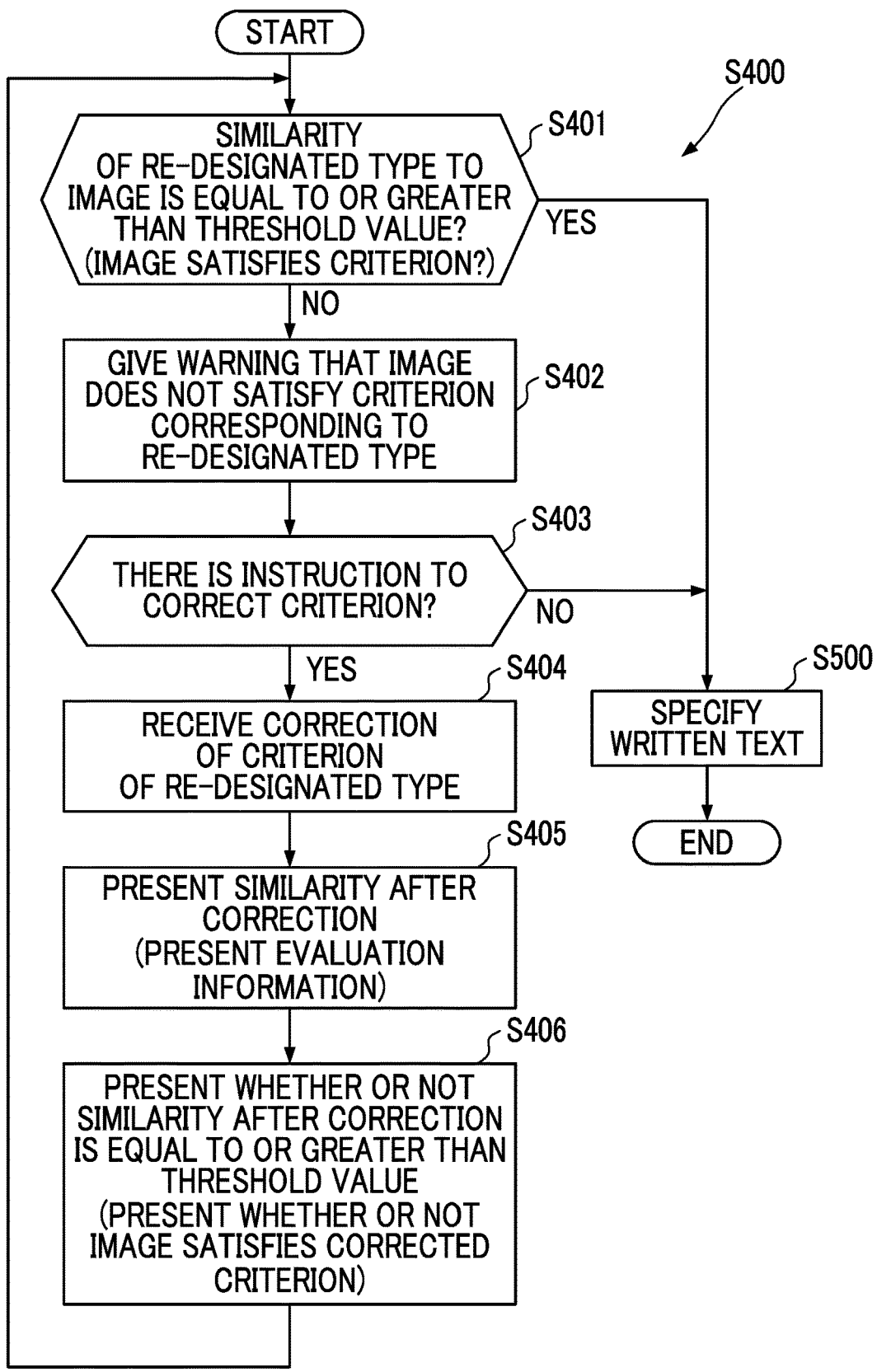
FIG. 16 is a flowchart showing an example of a flow of an operation to process the target image as an image of a re-designated type.

FIG. 16 is a flowchart showing an example of a flow of an operation to process the target image as the image of the re-designated type. In a case where the user presses the button B15 on the operation screen of FIG. 14, the information processing apparatus 1 starts the operation shown in FIG. 16. The operation shown in FIG. 16 is a detailed operation of Step S400 in the flowchart shown in FIG. 13.

The processor 11 of the information processing apparatus 1 determines whether or not the target image satisfies the criterion corresponding to the re-designated type (Step S401). In the example shown in FIG. 16, the processor 11 determines whether or not the similarity of the re-designated type to the target image is equal to or greater than the threshold value, thereby determining whether or not the target image satisfies the above-described criterion.

In a case where determination is made that the similarity of the re-designated type to the target image is equal to or greater than the threshold value (Step S401; YES), the processor 11 determines that the target image satisfies the above-described criterion, executes optical character recognition processing on the target image, and specifies written text included in the target image (Step S500).

On the other hand, in a case where determination is made that the similarity of the re-designated type to the target image is not equal to or greater than the threshold value (Step S401; NO), the processor 11 instructs the terminal 3 to give the user a warning that the target image does not satisfy the criterion corresponding to the re-designated type (Step S402).

Figure 17:
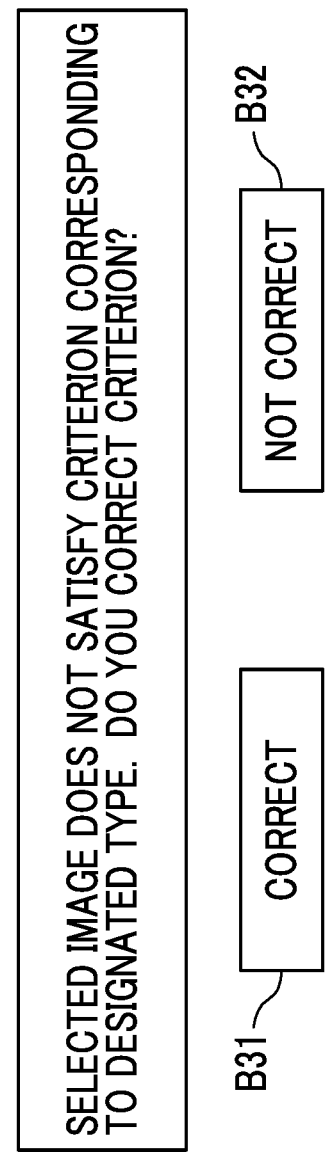
FIG. 17 is a diagram showing an example where a warning that the target image does not satisfy a criterion corresponding to the re-designated type is given.

FIG. 17 is a diagram showing an example where a warning that the target image does not satisfy the criterion corresponding to the re-designated type is given. In a case where the instruction of Step S402 described above is received from the information processing apparatus 1, as shown in FIG. 17, the terminal 3 displays a text string "Selected image does not satisfy criterion corresponding to designated type. Do you correct criterion?" on the display unit 35. Then, the terminal 3 displays a button B31 with a text string "correct" and a button B32 with a text string "not correct", and receives a user's operation through the operating unit 34.

In the operation shown in FIG. 16, the processor 11 determines whether or not there is an instruction to correct the criterion of the re-designated type (Step S403). In a case where determination is made that there is no instruction to correct the criterion of the re-designated type (Step S403; NO), the processor 11 progresses the process to Step S500.

On the other hand, in a case where determination is made that there is the instruction to correct the criterion of the re-designated type (Step S403; YES), the processor 11 receives correction of the criterion of the re-designated type (Step S404). That is, the processor 11 is an example of a processor that, in a case where an image indicated by acquired image data does not satisfy a criterion corresponding to a type indicated by re-designation, receives correction of the criterion.

The processor 11 may receive the correction of the criterion not only when the image does not satisfy the criterion corresponding to the type indicated by the re-designation but also when the image does not satisfy the criterion corresponding to the type initially designated by the user.

FIG. 18 is a diagram showing an example of an operation screen on which a patch is corrected in a document definition. On the operation screen shown in FIG. 18, patches P1 and P2 are displayed on an image indicating the document definition of the re-designated type in a superimposed manner. Both of the patches P1 and P2 are features that define the document, and the arrangement of the patches P1 and P2, the shape of each of the patches P1 and P2, the size of each of the patches P1 and P2, and the like are defined in the feature table 1222 of the document definition DB 122.

The operation screen shown in FIG. 18 includes, below the image indicating the document definition of the re-designated type, a button B41 with a text string "add", a button B42 with a text string "delete", a button B43 with a text string "move", a button B44 with a text string "modify", and a button B45 with a text string "threshold value".

The button B41 is a button for adding a new patch to the document definition. In a case where the user presses the button B41, a new patch is added to the operation screen shown in FIG. 18.

The button B42 is a button for deleting a selected patch from the document definition. In a case where the user presses the button B42, a patch selected by the user is deleted from the operation screen shown in FIG. 18.

The button B43 is a button for moving a patch selected in the document definition. In a case where the user presses the button B43, a patch selected by the user can be moved by, for example, a drag operation of a mouse.

The button B44 is a button for modifying a patch selected in the document definition. In a case where the user presses the button B44, four corners or sides of the patch selected by the user can be selected, and the range or the shape of the patch can be modified.

The button B45 is a button for displaying an operation screen on which the threshold value for defining the criterion in the document definition is changed. In a case where the user presses the button B45, an operation screen for changing the threshold value of the patch selected by the user is displayed.

The processor 11 updates the document definition DB 122 according to an operation on the operation screen. That is, in a case where the patch is corrected by operating the operation screen shown in FIG. 18, a result of the correction is reflected in feature data in the feature table 1222 of the document definition DB 122.

Figure 19:
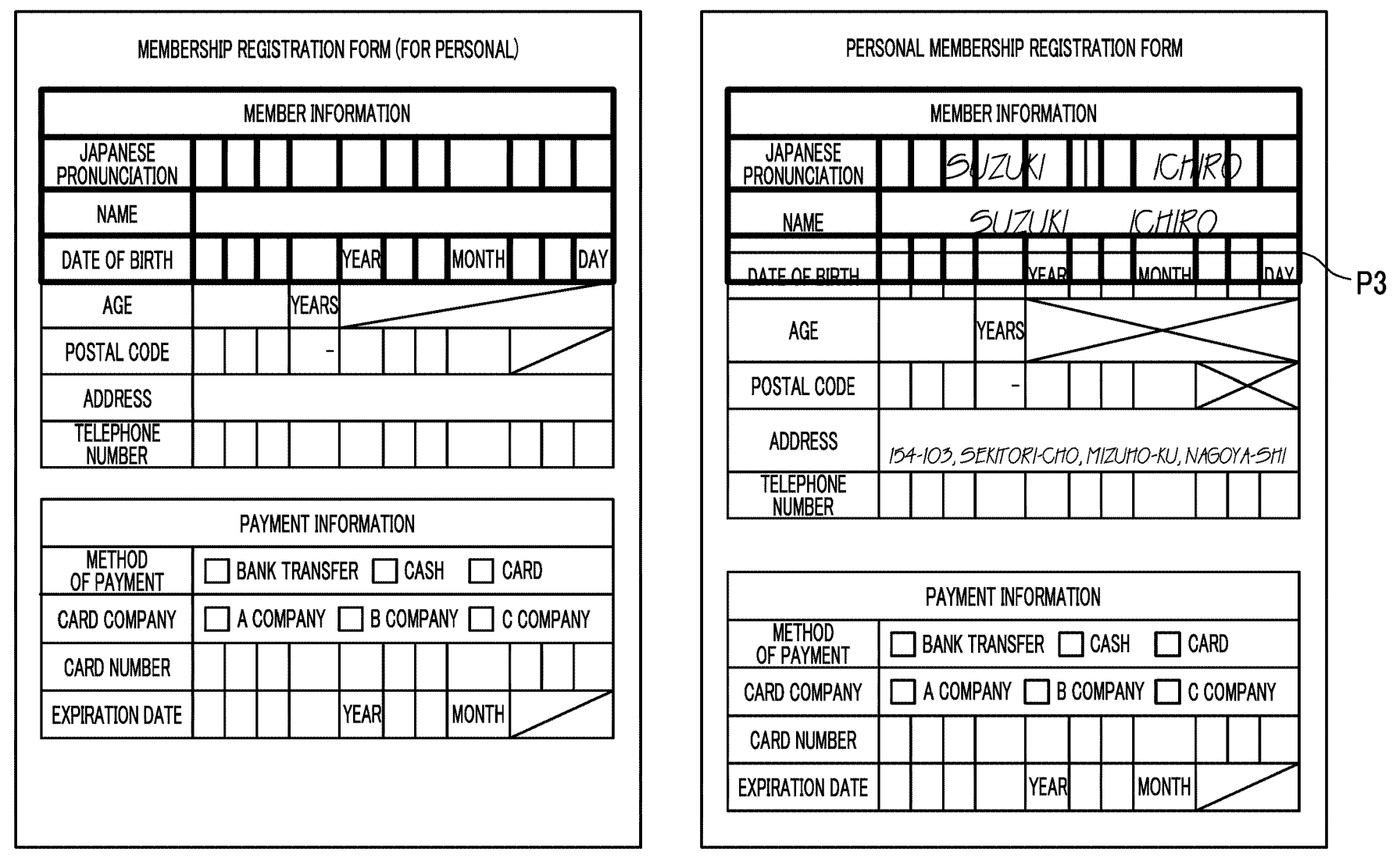

The operation screen on which the correction of the criterion of the re-designated type is received is not limited to the operation screen shown in FIG. 18. FIG. 19 is a diagram showing an example of an operation screen on which ruled lines are corrected in a document definition. On the operation screen shown in FIG. 19, the ruled lines defined as the feature of the document of the re-designated type are also displayed on a target screen in a superimposed manner. The user operates ruled line P3 that are displayed on the target screen in a superimposed manner in FIG. 19, whereby the shape of each of the ruled lines that define the document, the number of ruled lines, the range of the ruled lines, or the like is changed.

The processor 11 updates the document definition DB 122 according to an operation on the operation screen. That is, in a case where the ruled lines are corrected by operating the operation screen shown in FIG. 19, a result of the correction is reflected in feature data in the feature table 1222 of the document definition DB 122.

Figure 20:
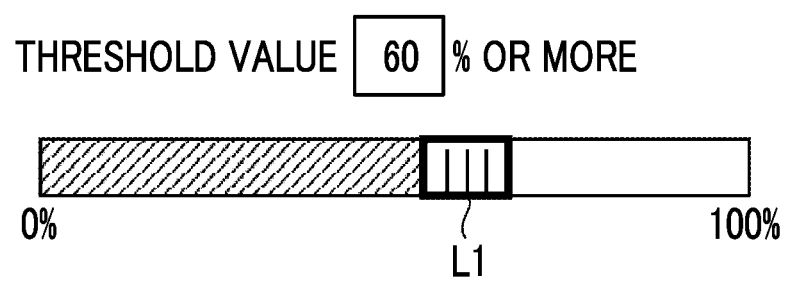
FIG. 20 is a diagram showing an example of an operation screen on which a threshold value applied to a criterion of a document definition is corrected.

FIG. 20 is a diagram showing an example of an operation screen on which a threshold value applied to a criterion of a document definition is corrected. In a case where the user presses the button B45 shown in FIG. 18, the operation screen shown in FIG. 20 is displayed on the display unit 35 of the terminal 3. In a case where the user clicks a virtual operator L1 on a slider and drags the virtual operator L1 right and left with a mouse or the like, text indicating a threshold value according to a position of the virtual operator L1 is displayed on the slider. With this, the user knows that the threshold value set at present is "60%".

The processor 11 updates the document definition DB 122 according to an operation on the operation screen. That is, in a case where the threshold value is corrected by operating the operation screen shown in FIG. 20, a result of the correction is reflected in the criterion in the feature table 1222 of the document definition DB 122.

In the operation shown in FIG. 16, in a case where the correction of the criterion of the re-designated type is received, the processor 11 presents a similarity of a type after the correction of the criterion to the target image (Step S405). The similarity after the correction is an example of information indicating an evaluation of the target image in the corrected criterion. That is, the processor 11 is an example of a processor that, in a case where correction of a criterion is received, presents information indicating an evaluation of a target image in the corrected criterion.

The processor 11 presents whether or not the similarity of the type after the correction of the criterion to the target image is equal to or greater than the threshold value (Step S406). Here, whether or not the similarity of the type after the correction of the criterion to the target image is equal to or greater than the threshold value is an example of information indicating whether or not the target image satisfies the corrected criterion. That is, the processor 11 is an example of a processor that, in a case where correction of a criterion is received, presents information indicating whether or not a target image satisfies the corrected criterion.

Figure 21:
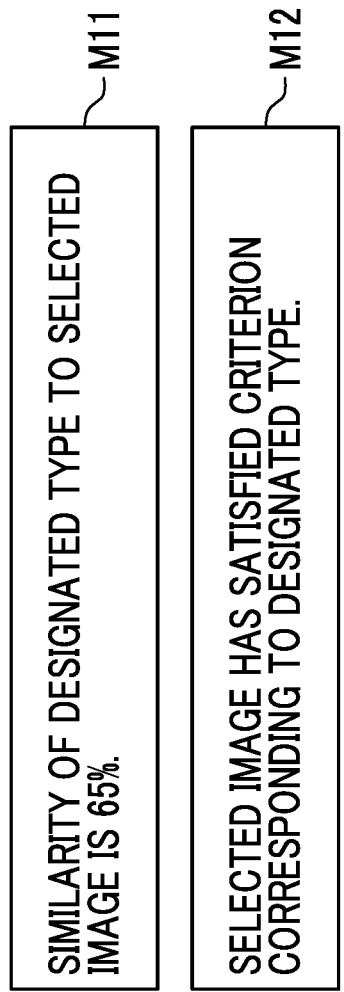
FIG. 21 is a diagram showing an example of display relating to similarity after the criterion is corrected.

FIG. 21 is a diagram showing an example of display relating to a similarity after correction of a criterion. Messages M11 and M12 shown in FIG. 21 are displayed on the terminal 3. In the message M11, a text string "Similarity of designated type to selected image is 65%" is described. With this, the user knows that the similarity of the type after the correction of the criterion to the target image is 65%.

In the message M12 shown in FIG. 21, a text string "Selected image has satisfied criterion corresponding to designated type" is described. With this, the user knows that the similarity of the type after the correction of the criterion to the target image has satisfied the criterion to be equal to or greater than threshold value (for example, 60%).

After Step S406 is executed, the processor 11 returns the process to Step S401. The processor 11 repeatedly executes Steps S401 to S406 to correct the definition of the type of the target image intended by the user, and when determination is made that correction is not needed, executes processing of specifying written text.

Figure 22:
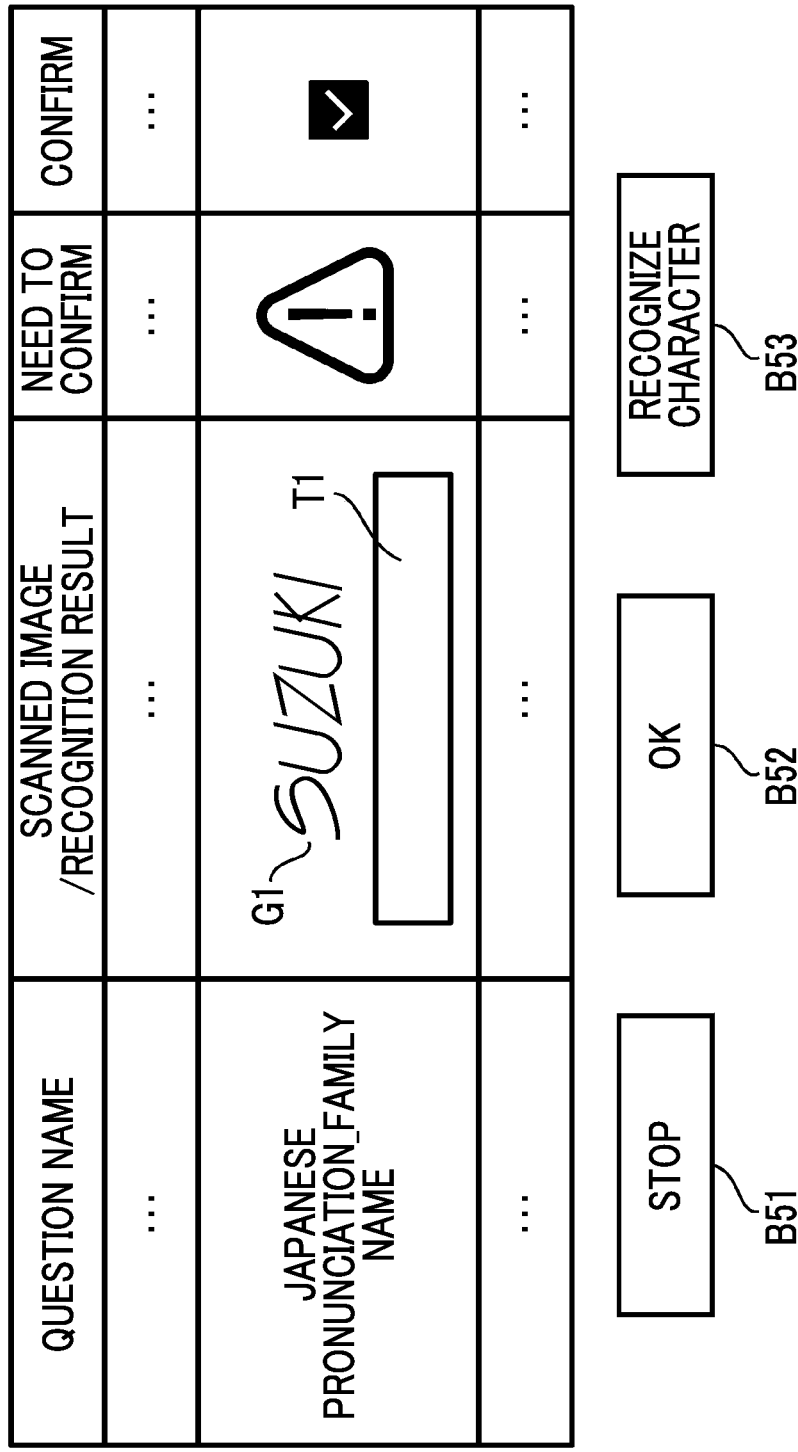
FIG. 22 is a diagram showing an example of an operation screen on which written text is specified by a manual input.

FIG. 22 is a diagram showing an example of an operation screen on which written text is specified with a manual input. On the operation screen shown in FIG. 22, a table having four fields of "question name", "scanned image/recognition result", "need to confirm", and "confirm" is displayed. In the field "scanned image/recognition result", a text image G1 indicating handwritten text responded to corresponding "question name" by the user and an input field T1 of text associated with the handwritten text by the user below the text image G1 are displayed.

In a case where an icon indicating attention is displayed in the field "need to confirm", this indicates that a question of corresponding "question name" is a question to which an input is needed. A check box is displayed in the field "confirm", and in a case where the user performs a touch operation on the check box, this indicates the user confirms a set of the text image G1 and the input field T1 in the corresponding "scanned image/recognition result".

The operation screen includes, below the above-described table, a button B51 with a text string "stop", a button B52 with a text string "OK", and a button B53 with a text string "recognize character".

The button B51 is a button for stopping an operation on the operation screen of FIG. 22. The button B52 is a button for deciding text input to the input field T1 by the user as text associated with the handwritten text indicated by the text image G1. The button B53 is a button for instructing the information processing apparatus 1 to execute optical character recognition processing on the handwritten text indicated by the text image G1.

In a case where the user presses the button B53, the optical character recognition processing on the handwritten text indicated by the text image G1 is executed in the processor 11 of the information processing apparatus 1, and a text string that is a recognition result is input to the input field T1. After the optical character recognition processing is executed and the input field T1 is input or after the user operates the operating unit 34 to input text to the input field T1, in a case where the user checks the check box in the field "confirm" and presses the button B52, text input to the input field T1 is stored in the memory 12 as a recognition result of the handwritten text indicated by the text image G1 in the target image.

As the operation described above is performed, when the image reading apparatus 2 reads an image different from a designated type, or the like, the information processing system 9 reduces an operation burden of the user in resetting a type for the image compared to a case where another type specified from the image is not presented.

<Modification Examples>

Although the above description is the description of the exemplary embodiment, the content of the exemplary embodiment may be modified as follows. The following modification examples may be combined.

<1>

In the above-described exemplary embodiment, although, as a so-called client-server system in which the image reading apparatus 2 and the information processing apparatus 1 are connected is configured, when an image different from a designated type is read, the information processing system 9 specifies and presents another type from the image, a single apparatus may execute the processing. In this case, for example, the image reading apparatus 2 may implement the functions that are implemented by the information processing apparatus 1 and the terminal 3.

<2>

In the above-described exemplary embodiment, although the information processing apparatus 1 has the processor 11 configured of the CPU, a control unit that controls the information processing apparatus 1 may have other configurations. For example, the information processing apparatus 1 may have various processors or the like in addition to the CPU.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

<3>

In the embodiments above, the term "processor 11" is broad enough to encompass one processor 11 or plural processors in collaboration which are located physically apart from each other but may work cooperatively.

The order of operations of the processor is not limited to one described in the embodiments above, and may be changed.

A part of the functions that are implemented by the processor 11 in the above-described exemplary embodiments may be carried by the processor 21 or the processor 31.

<4>

In the above-described exemplary embodiments, although the processor 11 that performs the operation shown in FIG. 10 specifies another type having a higher similarity to the target image than the designated type, the processor 11 may specify another type of a criterion to be satisfied by the target image.

Figure 23:
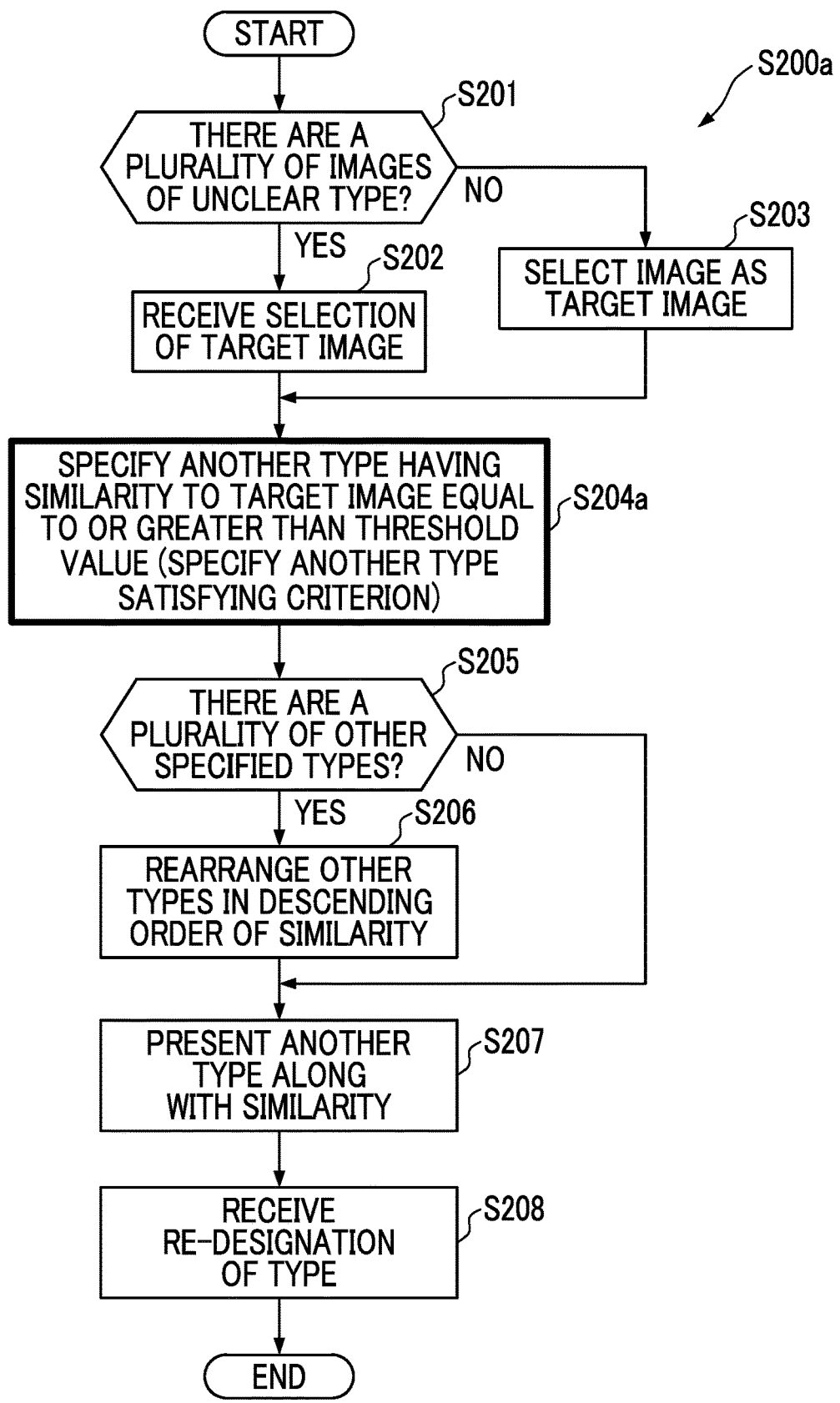
FIG. 23 is a flowchart showing an example of a flow of an operation to process an image as an unclear type in a modification example.

FIG. 23 is a flowchart showing an example of a flow of an operation to process an image as an unclear type in a modification example. The operation shown in FIG. 23 is a detailed operation of Step S200a that is a variation of Step S200 in the flowchart shown in FIG. 9.

In the flow shown in FIG. 23, the processor 11 executes Step S204a instead of Step S204. That is, in a case where the target image is decided, the processor 11 specifies another type having a similarity to the target image equal to or greater than the threshold value (Step S204a). The specified "another type" is presented along with the similarity by the processor 11 in Step S207. That is, the processor 11 of the modification example is an example of a processor that, in a case where an image indicated by acquired image data does not satisfy the criterion corresponding to the type indicated by the received designation, presents another type satisfying the criterion.

<5>

In the above-described exemplary embodiment, although the processor 11 displays the evaluation information M1, M2, and M3 for the other types to be a candidate of re-designation, respectively, information to be displayed is not limited thereto. For example, information indicating whether or not the target image satisfies a criterion corresponding to each of the other types to be a candidate may be presented. Information may be expressed, for example, by text "satisfied" and "not satisfied" or may be expressed by colors such that the target image satisfies the criterion in a case where a background color is blue and the target image does not satisfy the criterion in a case where the background color is red. That is, the processor 11 of the modification example is an example of a processor that, in a case where an image indicated by acquired image data does not satisfy the criterion corresponding to the type indicated by the received designation, presents information indicating whether or not the image satisfies the criterion corresponding to another type.

<6>

The programs that are executed by the processor 11 of the information processing apparatus 1 described above are an example of a program that causes a computer having a processor to execute a step of acquiring an image, a step of receiving designation of a type of the image, a step of presenting another type specified from the image in a case where the type does not satisfy a criterion corresponding to the image, and a step of receiving re-designation of a type of the image.

The programs can be provided in a state stored in a computer readable recording medium, for example, a magnetic recording medium, such as a magnetic tape or a magnetic disk, an optical recording medium, such as an optical disc, a magneto-optical recording medium, a semiconductor memory, or the like. The programs may be downloaded through a communication line, such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to
acquire an image from an image reading apparatus,
receive designation of a type of the image,
present another type specified from the image in a case where the type does not satisfy a criterion corresponding to the image, and
receive re-designation of a type of the image without changing the image.

2. The information processing apparatus according to claim 1,
wherein the processor is configured to present the other type having a higher similarity to the image than the type in a case where a similarity of the type to the image is not equal to or greater than a threshold value.

3. The information processing apparatus according to claim 2,
wherein the processor is configured to perform control such that the image and an image corresponding to the other type are displayed on an identical screen.

4. The information processing apparatus according to claim 2,
wherein the processor is configured to receive adjustment of the image in a case where the image does not satisfy a criterion corresponding to the type.

5. The information processing apparatus according to claim 4,
wherein the processor is configured to perform control such that an evaluation of the image adjusted in the criterion corresponding to the type or the other type is displayed.

6. The information processing apparatus according to claim 2,
wherein the processor is configured to, in a case where the image does not satisfy a criterion corresponding to the type, receive correction of the criterion.

7. The information processing apparatus according to claim 1,
wherein the processor is configured to present the other type that satisfies the criterion in a case where the image does not satisfy a criterion corresponding to the type.

8. The information processing apparatus according to claim 7,
wherein the processor is configured to perform control such that the image and an image corresponding to the other type are displayed on an identical screen.

9. The information processing apparatus according to claim 7,
wherein the processor is configured to receive adjustment of the image in a case where the image does not satisfy a criterion corresponding to the type.

10. The information processing apparatus according to claim 9,
wherein the processor is configured to perform control such that an evaluation of the image adjusted in the criterion corresponding to the type or the other type is displayed.

11. The information processing apparatus according to claim 7,
wherein the processor is configured to, in a case where the image does not satisfy a criterion corresponding to the type, receive correction of the criterion.

12. The information processing apparatus according to claim 1,
wherein the processor is configured to receive adjustment of the image in a case where the image does not satisfy a criterion corresponding to the type.

13. The information processing apparatus according to claim 12,
wherein the processor is configured to perform control such that an evaluation of the image adjusted in the criterion corresponding to the type or the other type is displayed.

14. The information processing apparatus according to claim 1,
wherein the processor is configured to, in a case where the image does not satisfy a criterion corresponding to the type, receive correction of the criterion.

15. The information processing apparatus according to claim 14,
wherein the processor is configured to, in a case where the correction of the criterion is received, present information indicating an evaluation of the image in the corrected criterion.

16. The information processing apparatus according to claim 1,
wherein the processor is configured to, in a case where there are a plurality of the other types, present each of the other types in a descending order of a similarity of each of the other types to the image.

17. The information processing apparatus according to claim 1,
wherein the processor is configured to, in a case where the image does not satisfy a criterion corresponding to the type, present information indicating a similarity of the other type to the image.

18. The information processing apparatus according to claim 1,
wherein the processor is configured to, in a case where the image does not satisfy a criterion corresponding to the type, present information indicating whether or not the image satisfies a criterion corresponding to the other type.

19. An image reading apparatus comprising:
a scanner; and
a processor configured to
acquire an image read by the scanner,
receive designation of a type of the image,
present another type specified from the image in a case where the image does not satisfy a criterion corresponding to the type, and
receive re-designation of a type of the image without changing the image.

20. A non-transitory computer readable medium storing a program causing a computer including a processor to execute a process, the process comprising:
acquiring an image from an image reading apparatus;
receiving designation of a type of the image;
presenting another type specified from the image in a case where the type does not satisfy a criterion corresponding to the image; and
receiving re-designation of a type of the image without changing the image.

* * * * *